(12) United States Patent
Guo et al.

(10) Patent No.: US 8,917,469 B1
(45) Date of Patent: Dec. 23, 2014

(54) DISK DRIVE CORRECTING AN ERROR IN A DETECTED GRAY CODE

(75) Inventors: Guoxiao Guo, Irvine, CA (US); Donald Brunnett, Pleasanton, CA (US); Jianguo Zhou, Foothill Ranch, CA (US); Wai Ee Wong, Singapore (SG)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/614,894

(22) Filed: Sep. 13, 2012

(51) Int. Cl.
*G11B 5/09* (2006.01)

(52) U.S. Cl.
USPC .............................................. 360/53; 360/49

(58) Field of Classification Search
CPC ............................................... G11B 20/10268
See application file for complete search history.

(56) References Cited

U.S. PATENT DOCUMENTS

| | | | |
|---|---|---|---|
| 4,949,200 A | 8/1990 | Weng | |
| 5,459,623 A | 10/1995 | Blagaila et al. | |
| 5,589,998 A | 12/1996 | Yu | |
| 5,600,499 A | 2/1997 | Acosta et al. | |
| 5,737,142 A | 4/1998 | Zook | |
| 5,757,567 A | 5/1998 | Hetzler et al. | |
| 5,784,219 A | 7/1998 | Genheimer | |
| 5,852,522 A | 12/1998 | Lee | |
| 5,909,334 A | 6/1999 | Barr et al. | |
| 5,917,439 A | 6/1999 | Cowen | |
| 5,982,308 A | 11/1999 | Bang | |
| 6,005,727 A | 12/1999 | Behrens et al. | |
| 6,038,091 A | 3/2000 | Reed et al. | |
| 6,043,946 A | 3/2000 | Genheimer et al. | |
| 6,075,667 A | 6/2000 | Kisaka et al. | |
| 6,115,198 A | 9/2000 | Reed et al. | |
| 6,118,603 A | 9/2000 | Wilson et al. | |
| 6,201,652 B1 | 3/2001 | Rezzi et al. | |
| 6,226,138 B1 | 5/2001 | Blaum et al. | |
| 6,233,715 B1 | 5/2001 | Kuki et al. | |
| 6,288,861 B1 | 9/2001 | Blaum et al. | |
| 6,304,398 B1 | 10/2001 | Gaub et al. | |
| 6,313,963 B1 | 11/2001 | Hsieh | |
| 6,345,021 B1 | 2/2002 | Belser et al. | |
| 6,405,342 B1 | 6/2002 | Lee | |
| 6,434,719 B1 | 8/2002 | Livingston | |
| 6,604,223 B1 | 8/2003 | Belser et al. | |

(Continued)

OTHER PUBLICATIONS

Hagenauer et al., "A Viterbi Algorithm with Soft-Decision Outputs and its Applications," in Proc. IEEE Global Telecommunications Conference 1989, Dallas, Texas, Nov. 1989, pp. 1680-1686.

(Continued)

*Primary Examiner* — Daniell L Negron

(57) ABSTRACT

A disk drive is disclosed comprising a head actuated over a disk comprising a plurality of tracks defined by a plurality of servo sectors. An estimated track ID is generated and a plurality of proximate track IDs is generated having values proximate the estimated track ID. A set of Gray codes is generated each corresponding to the estimated track ID and the proximate track IDs, wherein each Gray code in the set of Gray codes comprises N bits, and M bits out of a high order of the N bits comprise the same value. A recorded Gray code is detected in a first servo sector to generate a detected Gray code, and an error in the detected Gray code is corrected by inverting at least one bit in the detected Gray code comprising a value that is different from the value of the corresponding bit in the M bits.

8 Claims, 9 Drawing Sheets

(56) References Cited

U.S. PATENT DOCUMENTS

| | | |
|---|---|---|
| 6,738,205 B1 | 5/2004 | Moran et al. |
| 6,856,480 B2 | 2/2005 | Kuki et al. |
| 6,876,316 B1 | 4/2005 | Wu |
| 6,995,941 B1 | 2/2006 | Miyamura et al. |
| 7,026,965 B1 | 4/2006 | Wu |
| 7,047,477 B2 | 5/2006 | Tolhuizen et al. |
| 7,050,249 B1 | 5/2006 | Chue et al. |
| 7,099,095 B1 | 8/2006 | Subrahmanyam et al. |
| 7,126,775 B1 | 10/2006 | Zook |
| 7,184,230 B1 | 2/2007 | Chue et al. |
| 7,206,157 B2 | 4/2007 | Ehrlich |
| 7,307,810 B1 | 12/2007 | Kang et al. |
| 7,369,343 B1 | 5/2008 | Yeo et al. |
| 7,688,538 B1 | 3/2010 | Chen et al. |
| 7,701,661 B1 | 4/2010 | Bennett |
| 7,710,676 B1 | 5/2010 | Chue |
| 7,715,140 B2 | 5/2010 | Chu et al. |
| 7,800,853 B1 | 9/2010 | Guo et al. |
| 7,916,415 B1 | 3/2011 | Chue |
| 8,223,449 B2 | 7/2012 | Dunn |
| 8,693,123 B1 | 4/2014 | Guo et al. |
| 2003/0039047 A1 | 2/2003 | Ottesen et al. |
| 2009/0168227 A1 | 7/2009 | Blaum et al. |
| 2013/0250448 A1* | 9/2013 | Ozturk et al. .......... 360/53 |

OTHER PUBLICATIONS

B. Vasic, E. M. Kurtas, A. Patapoutian, "Coding and Signal Processing for Magnetic Recording Systems", 2005, Chapter 29, CRC Press, Boca Raton, Florida, United States.

* cited by examiner

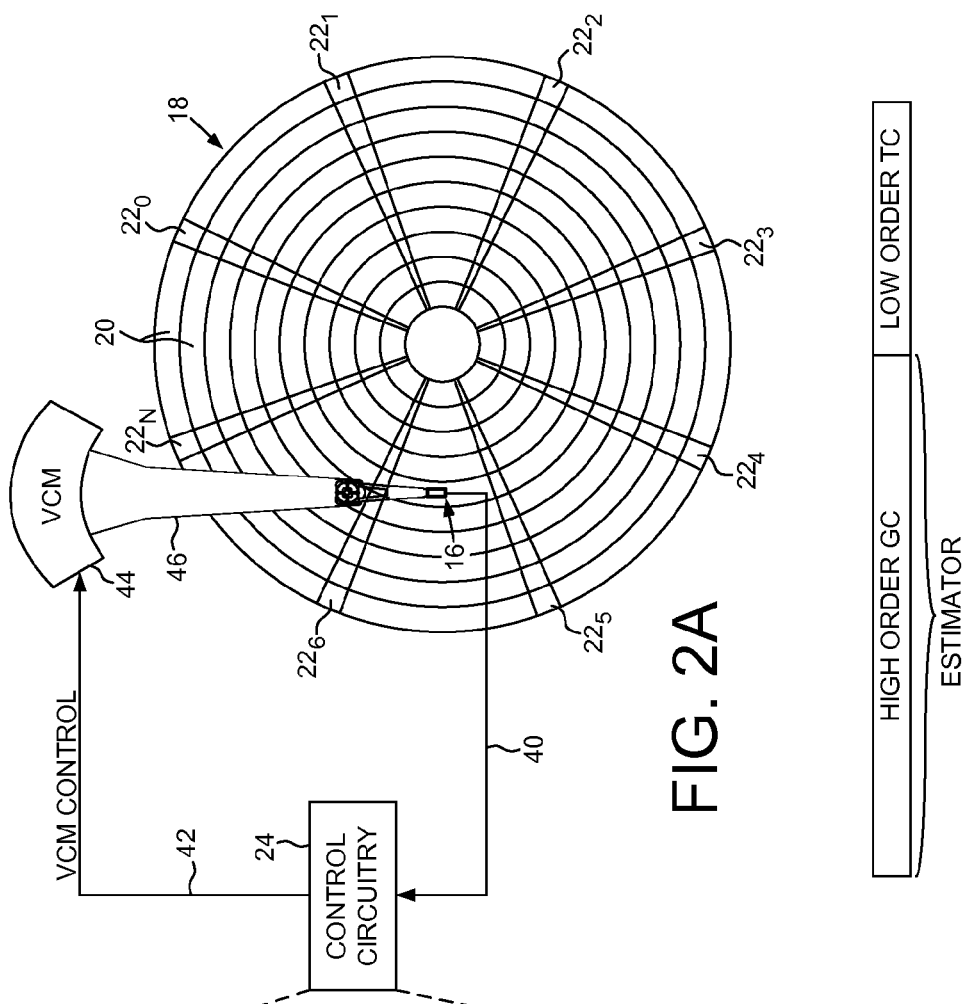
FIG. 2A
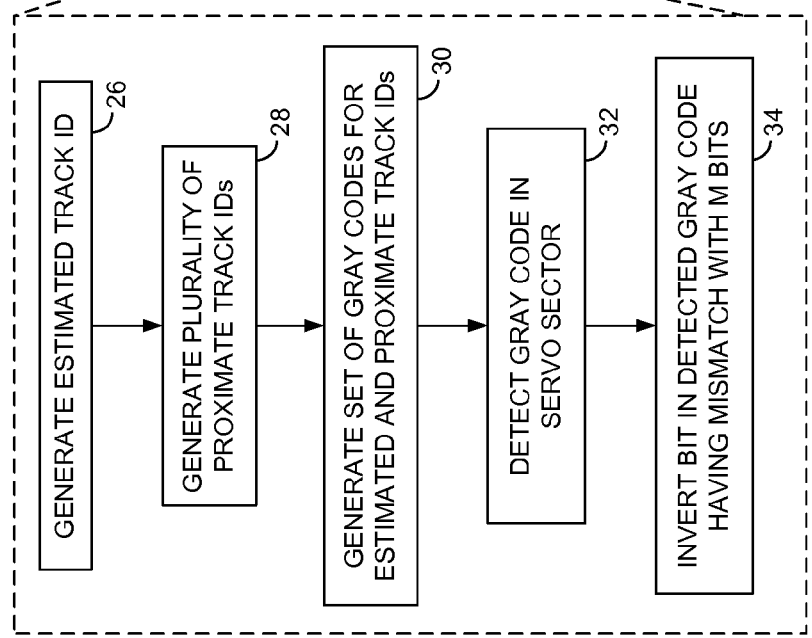
FIG. 2B
| HIGH ORDER GC | LOW ORDER TC |
|---|---|
ESTIMATOR
FIG. 2C

FIG. 4A
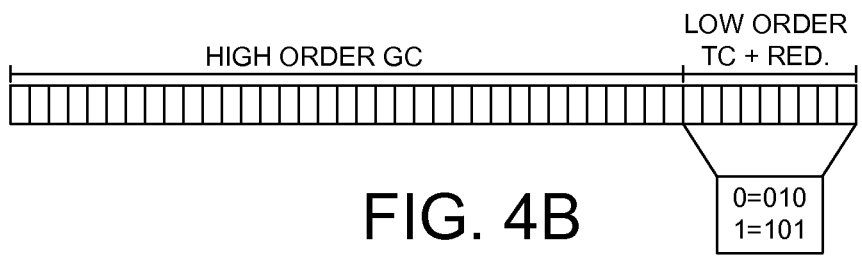
FIG. 4B
| DETECTED | DECODED |
|---|---|
| 000 011 010 110 | 0 |
| 111 100 101 001 | 1 |
FIG. 4C

| Row | Bit Values | Note |
|---|---|---|
| 1 | 0001100010010000100 | 34567 (Target TID Gray Code |
| 2 | 0001100010010001100 | 34568 (Target TID+1 Gray Code |
| 3 | 0001100010010000101 | 34566 (Target TID-1 Gray Code |
| 4 | 1111111111111110110 | Bits to correct (common bits of above 3 rows as one) |
| 5 | 000110001001000x10y | Valid Target Gray code (common bits of valid targets. x, y don't care) |
| 6 | 0101100010010000100 | Detected Gray Code to correct |
| 7 | 010000000000000x00y | Detected bits being different from Target Total 1 bits |
| 8 | 0100000000000000000 | Bits to flip in detected Gray Code |
| 9 | 0001100010010000100 | Corrected Gray Code after flipping, TID is 34567 |

| Case | 1 bit error Gray Code | TID X=0, y=0 | TID X=1, y=0 | TID x=0, y=1 |
|---|---|---|---|---|
| 1 | 1001100001001000x10y | 489720 | 489719 | 489721 |
| 2 | 0101100001001000x10y | 227576 | 227575 | 227577 |
| 3 | 0011100001001000x10y | 96504 | 96503 | 96505 |
| 4 | 0000100001001000x10y | 30968 | 30967 | 30969 |
| 5 | 0001000001001000x10y | 63736 | 63735 | 63737 |
| 6 | 0001110001001000x10y | 47352 | 47351 | 47353 |
| 7 | 0001101001001000x10y | 39160 | 39159 | 39161 |
| 8 | 0001100101001000x10y | 35064 | 35063 | 35065 |
| 9 | 0001100001001000x10y | 33016 | 33015 | 33017 |
| 10 | 0001100011101000x10y | 34040 | 34039 | 34041 |
| 11 | 0001100001011000x10y | 34552 | 34551 | 34553 |
| 12 | 0001100001000100x10y | 34695 | 34807 | 34809 |
| 13 | 0001100001001100x10y | 34680 | 34679 | 34681 |
| 14 | 0001100001001010x10y | 34616 | 34615 | 34617 |
| 15 | 0001100001001001x10y | 34584 | 34583 | 34585 |
| 16 | 0001100001001000x00y | 34560 | 34575 | 34561 |
| 17 | 0001100001001000x11y | 34564 | 34571 | 34565 |
| Result | 0001100001001000x10y (Target) | 34567 (corrected) | 34568 (corrected) | 34566 (corrected) |

FIG. 5C

| Case | 2 bit error Gray Code | TID | | |
|---|---|---|---|---|
| | | X=0, y=0 | X=1, y=0 | X=0, y=1 |
| 1 | 1101100010010000x10y | 296711 | 296712 | 296710 |
| 2 | 1011100010010000x10y | 427783 | 427784 | 427782 |
| ... | ... | | | |
| | 1001100010010000x11y | 489723 | 489716 | 489722 |
| | 1111100010010000x10y | 165639 | 165640 | 165638 |
| ... | ... | | | |
| | 0001100010010000x01y | 34563 | 34572 | 34562 |
| Result | 0001100010010000x10y (Target) | 34567 (Corrected) | 34568 (Corrected) | 34566 (Corrected) |

FIG. 5D

| TRACK ID | GRAY CODE | DIFF BIT | OFFSET |
|---|---|---|---|
| 522163 | 1000000110000100010 | 13 | -8 |
| 522164 | 1000000110000100011 | 13 | -7 |
| 522165 | 1000000110000100001 | 13 | -6 |
| 522166 | 1000000110000100000 | 13 | -5 |
| 522167 | 1000000110001100000 | 17 | -4 |
| 522168 | 1000000110001100001 | 17 | -3 |
| 522169 | 1000000110001100011 | 17 | -2 |
| 522170 | 1000000110001100010 | 17 | -1 |
| 522172 | 1000000110001100111 | 19 | +1 |
| 522173 | 1000000110001100101 | 18 | +2 |
| 522174 | 1000000110001100100 | 18 | +3 |
| 522175 | 1000000110001111100 | 16 | +4 |
| 522176 | 1000000110001111101 | 16 | +5 |
| 522177 | 1000000110001111111 | 16 | +6 |
| 522178 | 1000000110001111110 | 16 | +7 |
| 522179 | 1000000110001111010 | 16 | +8 |
| 522171 | 10000001100011000110 |  | 0 |
|  | 111111101111xxxxxxx |  |  |

M ← → N-M
N

```
TRACK ID    HIGH GRAY CODE      LOW GRAY CODE
522163      10000001100001000   01 Z2
522164      10000001100001000   11 Z3
522165      10000001100001000   10 Z4
522166      10000001100001000   00 Z1
522167      10000001100011000   01 Z2
522168      10000001100011000   11 Z3
522169      10000001100011000   10 Z4
522170      10000001100011000   00 Z1
522171      10000001100011001   01 Z2
522172      10000001100011001   11 Z3
522173      10000001100011001   10 Z4
522174      10000001100011001   00 Z1
522175      10000001100011011   01 Z2
522176      10000001100011011   11 Z3
522177      10000001100011011   10 Z4
522178      10000001100011011   00 Z1
522179      10000001100011010   01 Z2
```

```
TRACK ID    HIGH GRAY CODE       LOW GRAY CODE
522163      100000011000010001   01 Z2
522164      100000011000010001   11 Z3
522165      100000011000010000   10 Z4
522166      100000011000010000   00 Z1
522167      100000011000110000   01 Z2
522168      100000011000110000   11 Z3
522169      100000011000110001   10 Z4
522170      100000011000110001   00 Z1
522171      100000011000110011   01 Z2
522172      100000011000110011   11 Z3
522173      100000011000110010   10 Z4
522174      100000011000110010   00 Z1
522175      100000011000110110   01 Z2
522176      100000011000110110   11 Z3
522177      100000011000110111   10 Z4
522178      100000011000110111   00 Z1
522179      100000011000110101   01 Z2
        BIT 19....................2   21
```

US 8,917,469 B1

DISK DRIVE CORRECTING AN ERROR IN A DETECTED GRAY CODE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track ID) which is read by the head and processed by a servo controller to control the actuator arm as it seeks from track to track.

FIG. 1 shows a prior art format of a disk 2 comprising a plurality of concentric tracks 4 having embedded servo sectors $6_0$-$6_N$. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track ID), and servo bursts 14 which provide fine head positioning information.

As the head passes over a servo sector, the head positioning information is processed to estimate the radial location of the head. The servo controller may comprise a state estimator which processes the detected head position to estimate various states of the head, such as its position, velocity, and acceleration. The estimated states may be compared to target values in a seek profile, wherein the error between the estimated states and target states is processed to generate a control signal applied to the VCM in order to move the head in a direction and velocity that reduces the error.

If the disk surface comprises defective servo sectors (which may be detected during a manufacturing procedure), the associated wedges of user data may be relocated to spare data sectors, or the entire data track may be relocated to a spare data track. However, relocating data wedges and/or data tracks is undesirable since it reduces the overall capacity of the disk and may also impact performance when seeking to the spare data wedges or spare data tracks. The state estimator in the servo controller will typically filter out miss-detected servo sectors during seek operations; however, if multiple sequential servo sectors are miss-detected during a seek, it may degrade performance by increasing the settle time. In addition, if the servo controller encounters a miss-detected servo sector while tracking the centerline of a data track during an access operation, the operation may be aborted and retried (particularly during write operations) which impacts performance due to the slipped revolutions.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a detected Gray code is corrected using a track ID estimator.

FIG. 2C shows an embodiment of the present invention wherein a servo sector comprises a high order Gray code and a low order track code decoded separately.

FIG. 4A shows an embodiment of the present invention wherein the low order track code comprises Gray coded bits recorded at a lower density than the high order Gray code.

FIGS. 4B and 4C illustrate an embodiment of the present invention wherein the low order track code comprises redundancy bits such that at least one bit error is corrected when decoding the low order track code.

FIG. 5A shows an embodiment of the present invention for correcting errors in the high order Gray code using the track ID estimator.

FIGS. 5B-5D show examples of correcting errors in the detected high order Gray code using the track ID estimator according to an embodiment of the present invention.

DETAILED DESCRIPTION OF EMBODIMENTS OF THE INVENTION

Figure 1:
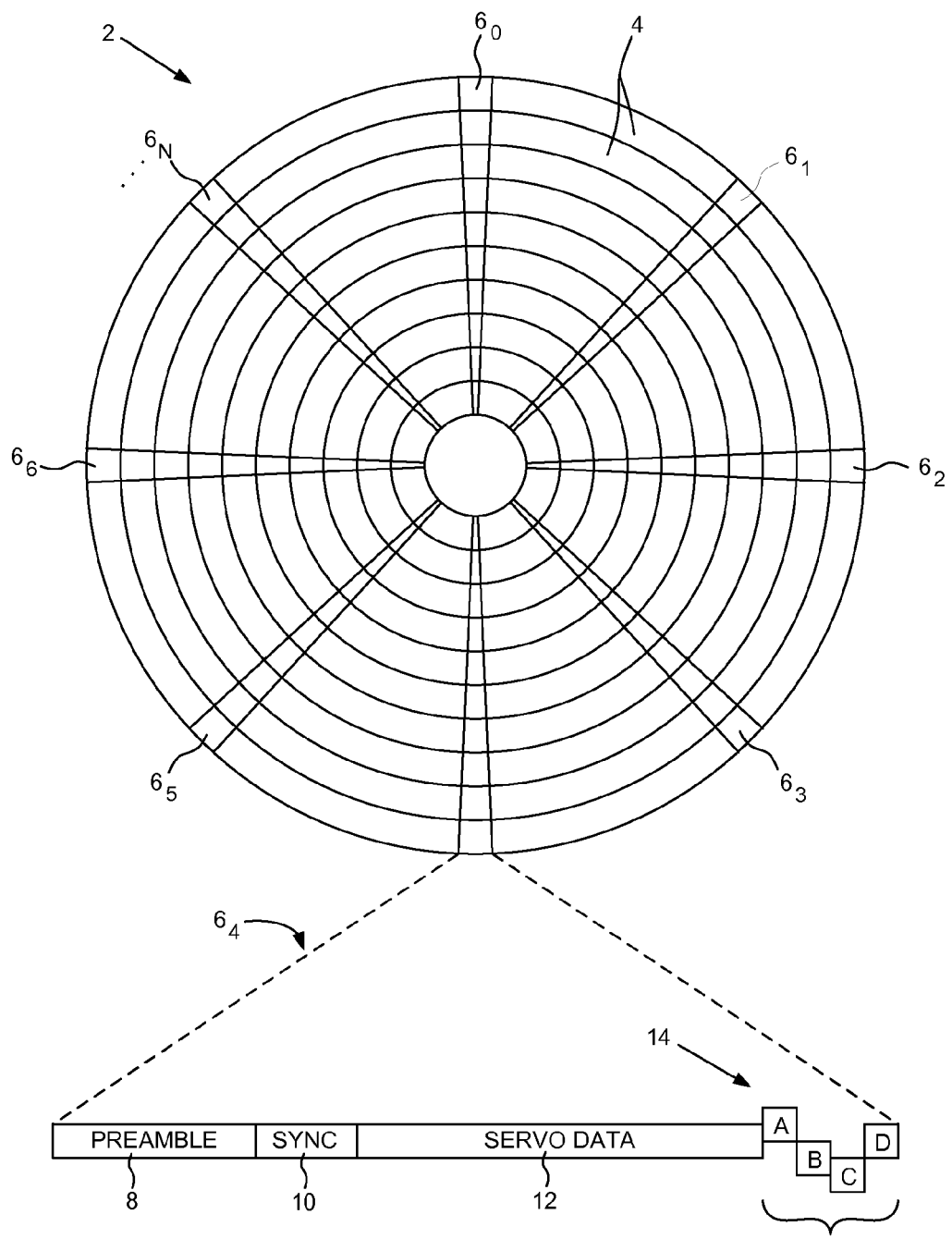
FIG. 1 shows a prior art disk format comprising a plurality of tracks defined by embedded servo sectors.

FIG. 2A shows a disk drive according to an embodiment of the present invention comprising a head 16 actuated over a disk 18 comprising a plurality of tracks 20 defined by a plurality of servo sectors ($22_0$-$22_N$). The disk drive further comprises control circuitry 24 operable to execute the flow diagram of FIG. 2B, wherein an estimated track ID is generated representing an estimated radial location of the head (block 26), and a plurality of proximate track IDs is generated having values proximate the estimated track ID (block 28). A set of Gray codes is generated each corresponding to the estimated track ID and the proximate track IDs (block 30), wherein each Gray code in the set of Gray codes comprises N bits, and M bits out of a high order of the N bits comprise the same value (FIG. 5E). A recorded Gray code is detected in a first servo sector to generate a detected Gray code (block 32), and an error in the detected Gray code is corrected by inverting at least one bit in the detected Gray code comprising a value that is different from the value of the corresponding bit in the M bits (block 34).

In one embodiment shown in FIG. 2C, a track ID is recorded in each servo sector by recording a high order Gray code and a low order track code. At least one bit error in the high order Gray code may be corrected based on the embodiment described above with reference to FIG. 2B, and at least one bit error in the low order track code may be corrected based on a technique disclosed below. In another embodiment, an ambiguity in the detected high order Gray code is resolved by overlapping at least the low order bit of the high order part of a track ID with a low order part of the track ID as described below with reference to FIG. 6B.

In the embodiment of FIG. 2A, the control circuitry 24 processes a read signal 40 emanating from the head 16 to demodulate the servo sectors $22_0$-$22_N$ and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 16 radially over the disk in a direction that reduces the PES. The servo sectors $22_0$-$22_N$ may comprise any suitable position information, such as a track address for coarse positioning and servo bursts for fine positioning.

Figure 3:
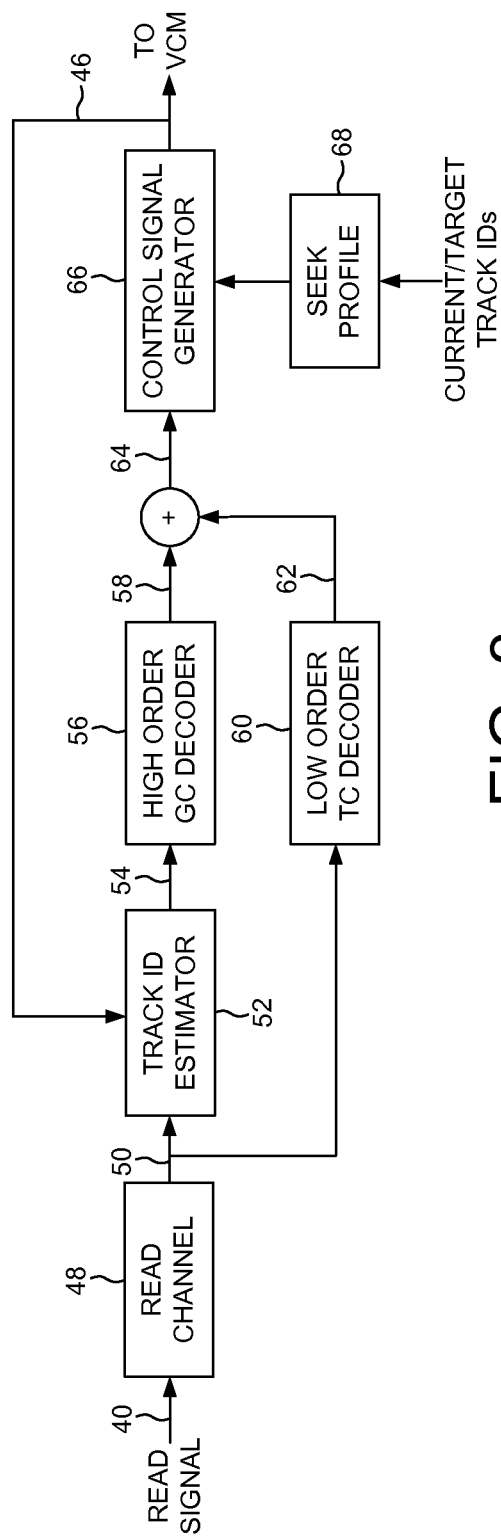
FIG. 3 shows an embodiment of the present invention wherein a track ID estimator is used to correct errors in the high order Gray code which is combined with the decoded low order track code.

FIG. 3 shows control circuitry according to an embodiment of the present invention including a read channel 48 that detects an estimated data sequence 50 from the read signal 40 generated as the head passes over a servo sector. The high order Gray code bits in the estimated data sequence 50 are corrected using a track ID estimator 52 to generate a corrected Gray code 54. A high order Gray code decoder 56 decodes the corrected Gray code 54 into a high order part of a detected track ID 58. A low order track code decoder 60 decodes the low order track code bits in the estimated data sequence 50 into a low order part of the detected track ID 62. The high order part of the detected track ID 58 is combined with the low order part of the detected track ID 62 to generate a final track ID 64 representing a detected radial location of the head.

In one embodiment, during a seek operation a seek profile 68 is generated in response to a current track ID the head is over and a target track ID corresponding to an access command. The seek profile 68 comprises a reference state (e.g., position and/or velocity). A control signal generator 66 processes the reference state and the detected track ID 64 to generate the control signal 46 applied to the VCM 44. The track ID estimator 52 processes the VCM control signal 46 in order to generate the estimated track ID representing an expected radial location of the head based on known parameters of the VCM servo system.

In the embodiments of the present invention, the high order Gray code represents the most significant bits of the track ID in a servo sector, and the low order track code represents the least significant bits of the track ID. Accordingly, the high order Gray code bits change at a much slower frequency than the low order track code bits as the head moves radially over the disk during a seek operation. This attribute makes errors in the high order Gray code readily correctable using the track ID estimator while achieving a high density of the Gray coded bits, whereas errors in the low order track code are more likely miscorrected using the track ID estimator. Therefore, a more accurate technique is employed to correct the low order track code while accepting a reduction in format efficiency. In one embodiment, the low order track code represents only a few bits of a servo sector track ID and therefore there is a minimal reduction in overall format efficiency while achieving a more accurate track ID detection algorithm.

FIG. 4A illustrates an embodiment of the present invention wherein the high order Gray code comprises a plurality of bits recorded at a first linear density, and the low order track code comprises a plurality of Gray coded bits recorded at a second linear density lower than the first linear density. In the example shown in FIG. 4A, the Gray coded bits in the low order track code are recorded at half the linear density than the Gray coded bits in the high order Gray code. Reducing the linear density of the low order track code reduces errors in detecting the Gray coded bits (e.g., by reducing inter-symbol interference). In addition, there is a minimal reduction in format efficiency since only a few of the least significant bits (three in the example of FIG. 4A) are recorded at a lower density.

In an alternative embodiment, the low order track code comprises a plurality of redundancy bits such that at least one bit error is corrected when decoding the low order track code into the second part of the detected track ID. In one embodiment, the low order track code comprises codewords having sufficient distance to enable correction of one or more of the detected bits. FIG. 4B illustrates an example of this embodiment wherein the three least significant bits of a track ID are encoded into a Gray codeword, and then each bit of the Gray codeword is encoded such that a "0" bit encodes into "010" and a "1" bit encodes into "101". When decoding the detected low order track code, any single bit error within every three bits is corrected as illustrated in FIG. 4C. The code rate in this example is 1/3, but the overall reduction in format efficiency is not significant since only a few of the least significant bits of the track ID are encoded into the low order track code (three bits in the example of FIG. 4B). The remaining most significant bits of the track ID are encoded into the high order Gray code having a code rate of 1/1, wherein errors are corrected by the track ID estimator.

In the examples of FIGS. 4A and 4B, the higher order Gray code bits and the low order track code bits are shown as written without any gap between the two. In an alternative embodiment (not shown), the high order Gray code bits may be written to the disk, followed by a gap, followed by the low order track code bits. The gap may optionally include synchronization information, such as a preamble and a sync mark for synchronizing to the low order track code bits.

Figures 5A, 5B:
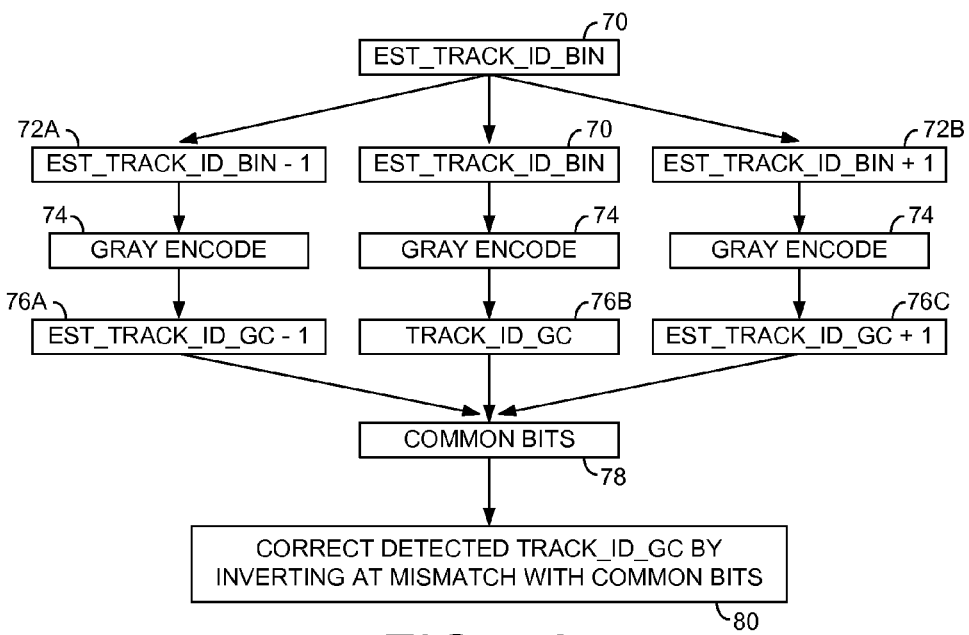
Figures 5E, 5F:
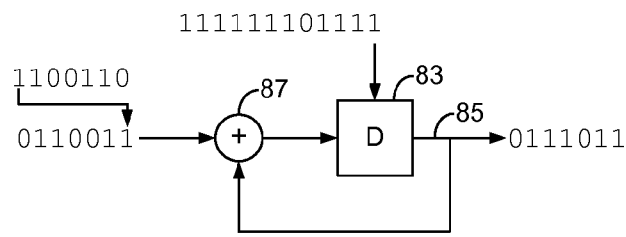
FIG. 5E shows an embodiment of the present invention wherein M higher order bits of the high order Gray code are considered for correction.
FIG. 5F shows an embodiment of the present invention wherein a plurality of the lower order bits of the corrected high order Gray code are converted into a partial track ID which is combined with the estimated track ID to generate a detected track ID.

FIG. 5A illustrates an example algorithm for implementing the track ID estimator, wherein after generating an estimated track ID 70 (represented in binary (BIN)), a plurality of proximate track IDs are generated having values proximate the estimated track ID (e.g., track_ID−1 72A and track_ID+1 72B). The estimated track ID and the proximate track IDs are encoded 74 into a set of Gray codes 76A, 76B, and 76C. At least one bit in the detected high order Gray code is then corrected in response to the set of Gray codes. For example, in one embodiment each Gray code in the set of Gray codes comprises N bits, and M bits out of the N bits comprise the same value 78. Errors in the high order Gray code are corrected by inverting at least one bit in the high order Gray code comprising a value that is different from the value of the corresponding bit in the M bits 80.

The algorithm described above with reference to FIG. 5A is illustrated in FIGS. 5B-5D. The first row of FIG. 5B illustrates an estimated track ID generated by the track ID estimator, and the next two rows show corresponding proximate track IDs. The fourth row shows a bit map of the common bits between the track IDs in the first three rows. The fifth row shows the estimated track ID with don't care bits representing the non-matching bits in the first three rows. The sixth row shows an example high order Gray code detected from the read signal, and the seventh row shows a bit in the detected high order Gray code that is different from the bits in row fifth row. The eighth row shows a bit map used to invert the different bit, and the ninth row shows the corresponding bit inverted in the detected high order Gray code (previously shown in the sixth row), thereby correcting the one bit error.

FIG. 5C illustrates a number of detected high order Gray codes having a single bit error, and the possible track IDs that are decoded before correcting the single bit error and after correcting the single bit error (last row). FIG. 5D illustrates a number of detected high order Gray codes having two bit errors, and the possible track IDs that are decoded before correcting the two bit errors and after correcting the two bit errors (last row). Although in the above examples the track ID estimator generates two proximate track IDs (track_ID+1 and track_ID−1), any suitable number of proximate track IDs may be generated, where increasing the number of proximate track IDs increases the number of don't care bits.

FIG. 5E illustrates an embodiment of the present invention wherein the track ID estimator generates significantly more than two proximate track IDs (16 proximate track IDs in the example shown). In order to reduced the correction time of the detected Gray code, the above described correction algorithm based on identifying the common bits in the estimated and proximate track IDs (block 78 of FIG. 5A) is modified so that only the M high order common bits are identified. In the example shown in FIG. 5E, the estimated track ID (522171) and 16 proximate track IDs are converted into their Gray code equivalent track ID each comprising N=19 bits. The M high order bits are common (M=12) and are used to correct the detected Gray code as described above, wherein the N-M lower order bits (N-M=7) are considered as don't care bits. The correction power of the above described algorithm is reduced since there are common low order bits ($5^{th}$ and $6^{th}$ low order bits) that are not used (considered as don't care bits). However, the correction time of the algorithm is reduced since it takes less time to identify only the common M high order bits.

In one embodiment, the M high order common bits across the Gray code representation of the proximate track IDs is determined by comparing only the end cases. In the example shown in FIG. 5E, there are 16 proximate track IDs including eight (−1 to −8) preceding the estimated track ID and eight (+1 to +8) following the estimated track ID. The M high order common bits across all 16 proximate track IDs can be determined by comparing the Gray code representation of the −8 proximate track ID to the Gray code representation of the +8 proximate track ID. In general when the proximate track IDs extend from −L to +L, an embodiment of the present invention determines the M high order common bits across the extent by comparing the Gray coded representation of only the −L proximate track ID to the +L proximate track ID.

In one embodiment in order to reduce the time needed to decode the corrected Gray code, the high order bits of the corrected Gray code are not decoded into the binary equivalent. Instead, the high order bits of the estimated track ID 70 (FIG. 5A) are assumed to be correct so that only the low order bits of the corrected Gray code need to be decoded. Example control circuitry for decoding the low order bits of the corrected Gray code is shown in FIG. 5F, wherein in the example shown the corrected Gray code 1000000110001100110 corresponds to track ID 522171 (FIG. 5E) having a decoded binary value of 1111111011110111011. In this embodiment, it is assumed the higher order 12 bits of the estimated track ID are correct and therefore not decoded. The low order 7 bits of the corrected Gray code (1100110) are decoded by initializing a register 83 with the last bit of the high order 12 bits of the estimated track ID (i.e., the last bit of 111111101111). The output 85 of the register 83 is then XORed 87 with the low order 7 bits (1100110) of the corrected Gray code (in reverse order as shown in FIG. 5F) with the result of the XOR 87 being shifted into the register 83. After performing 7 XOR and shift operations, the resulting decoded binary value (0111011) representing the low order part of the detected track ID is combined with the high order bits (111111101111) of the estimated track ID to form the detected track ID (1111111011110111011). In the example shown in FIG. 5F, only the low order 7 bits of the corrected Gray code are decoded; however, any suitable number of low order bits may be decoded (i.e., more or less than 7 bits).

Figures 6A, 6B, 6C:
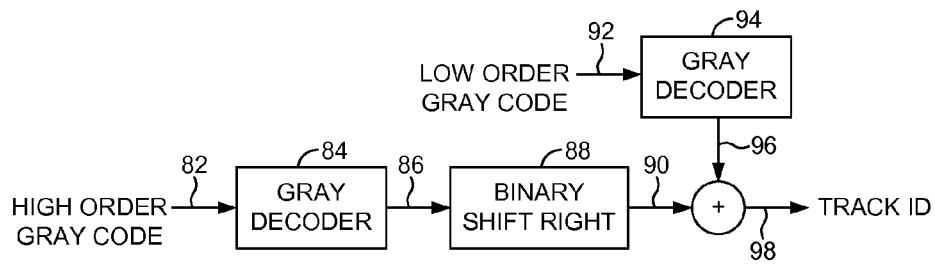
FIG. 6A illustrates an ambiguity that occurs when correcting the detected high order Gray code based on a radial location of the head derived from the servo bursts in a servo sector.
FIG. 6B illustrates how the ambiguity in FIG. 6A is resolved by overlapping at least the low order bit of the high order part of the track ID with the low order part of the track ID according to an embodiment of the present invention.
FIG. 6C shows an embodiment of the present invention wherein the overlapping bit in the high order part of the detected track ID is ignored when generating a final track ID.

FIG. 6A illustrates an embodiment of the present invention wherein the track ID is recorded in each servo sector in two parts: a high order Gray code and a low order track code (FIG. 2C). The high order bits (17 bits) of the track ID are encoded into a first Gray code recorded to the servo sector. The low order bits (2 bits) of the track ID are encoded into a second Gray code recorded to the servo sector using any suitable technique, such as described above with reference to FIGS. 4A and 4B. In one embodiment, the position of the head as derived from reading the servo bursts of the servo sector may be used to correct the detected Gray code (both the high order and low order Gray code). The position of the head relative to the servo bursts is divided into zones (e.g., Z1-Z4) examples of which are shown in FIG. 6A. Consider an example where the head is over a track ID corresponding to zone Z2 as determined from reading the servo bursts (e.g., the head may be over track ID 522167 or 522171). Since the high order Gray code corresponding to the four consecutive track IDs 522167 to 522170 is the same, there is an ambiguity as to whether the head may be detected as over track ID 522167 as well as in zone Z2, or whether the head is detected as over track ID 522171 (with a one bit error) as well as in zone Z2. In the first case no correction is needed to the high order Gray code, whereas in the second case the high order Gray code should be incremented by one track ID in order to correct the one bit error.

In order to overcome the above-described ambiguity in the bit arrangement shown in FIG. 6A, in one embodiment at least the low order bit of the high order part of the detected track ID overlaps with the low order part of the detected track ID. This is illustrated in FIG. 6B wherein the track ID comprises 19 bits. When recording the track ID, the high order part of the track ID is selected as bits 19-2 and the low order part of the track ID is selected as bits 2-1 (so that bit 2 of the high order part overlaps with bit 2 of the low order part). As a result, the high order Gray code will be the same for every two tracks rather than for every four tracks as in FIG. 6A, which overcomes the above-described ambiguity in the bit arrangement shown in FIG. 6A. In the above described example, when the head is over zone Z2 as determined from reading the servo bursts there is no ambiguity between the Gray code for track ID 522167 and track ID 522170 due to the additional bit that overlaps with the low order Gray code. Therefore when the high order Gray code is detected as track ID 522170 or 522169, and the head is detected over zone Z2 as determined by the servo bursts, the high order Gray code is incremented to 522171 in order to correct for the one bit error (in one embodiment, the high order part of the track ID decoded from the detected high order Gray code is incremented instead of incrementing the detected high order Gray code).

FIG. 6C shows control circuitry according to an embodiment of the present invention for decoding the high order Gray code and the low order Gray code shown in the embodiment of FIG. 6B. The detected high order Gray code 82 is decoded using a Gray decoder 84 into a high order part of the track ID 86 which is shifted right by one bit at block 88 so that the low order bit of the high order part is ignored. The detected low order Gray code 92 is decoded using a Gray decoder 94 into a low order part of the track ID 96 which is combined with the shifted, high order part of the track ID 90 to generate a final track ID 98. In one embodiment, in the above-described correction algorithm based on the zone detected from the servo bursts, the correction (increment of decrement) is applied to the high part order part of the track ID 86 or 90 before or after the binary shift right 88.

Any suitable technique may be employed to write the track ID in the servo sectors of a disk drive. In one embodiment, an external servo writer or media writer may be employed to write the track ID in the servo sectors according to the embodiments of the present invention. Alternatively, the control circuitry within each production disk drive may write the track ID in the servo sectors during a self servo writing operation. In yet another embodiment, the track ID may be written in the servo sectors using a suitable stamping or patterning technique prior to inserting the disk into the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks defined by a plurality of servo sectors;
   a head actuated over the disk; and
   control circuitry operable to:
      generate an estimated track ID representing an estimated radial location of the head;
      generate a plurality of proximate track IDs having values proximate the estimated track ID;
      generate a set of Gray codes each corresponding to the estimated track ID and the proximate track IDs, wherein each Gray code in the set of Gray codes comprises N bits, and M bits out of a high order of the N bits comprise the same value;
      detect a Gray code in a first servo sector to generate a detected Gray code; and
      correct an error in the detected Gray code by inverting at least one bit in the detected Gray code comprising a value that is different from the value of the corresponding bit in the M bits,
   wherein:
      the plurality of proximate track IDs extend from a −L proximate track ID preceding the estimated track ID to a +L proximate track ID following the estimated track ID;
      L is an integer greater than one; and
      the control circuitry is further operable to determine the M bits by comparing only the Gray code representing the −L proximate track ID to the Gray code representing the +L proximate track ID.

2. The disk drive as recited in claim 1, wherein the control circuitry is further operable to convert a subset of the corrected Gray code into a partial track ID.

3. The disk drive as recited in claim 2, wherein the control circuitry is further operable to convert a plurality of the lower order bits of the corrected Gray code into the partial track ID.

4. The disk drive as recited in claim 3, wherein the control circuitry is further operable to combine the estimated track ID with the partial track ID to generate a detected track ID.

5. A method of operating a disk drive, the disk drive comprising a head actuated over a disk comprising a plurality of tracks defined by a plurality of servo sectors, the method comprising:
   generating an estimated track ID representing an estimated radial location of the head;
   generating a plurality of proximate track IDs having values proximate the estimated track ID;
   generating a set of Gray codes each corresponding to the estimated track ID and the proximate track IDs, wherein each Gray code in the set of Gray codes comprises N bits, and M bits out of a high order of the N bits comprise the same value;
   detecting a recorded Gray code in a first servo sector to generate a detected Gray code; and
   correcting an error in the detected Gray code by inverting at least one bit in the detected Gray code comprising a value that is different from the value of the corresponding bit in the M bits,
   wherein:
      the plurality of proximate track IDs extend from a −L proximate track ID preceding the estimated track ID to a +L proximate track ID following the estimated track ID;
      L is an integer greater than one; and
      further comprising determining the M bits by comparing only the Gray code representing the −L proximate track ID to the Gray code representing the +L proximate track ID.

6. The method as recited in claim 5, further comprising converting a subset of the corrected Gray code into a partial track ID.

7. The method as recited in claim 6, further comprising converting a plurality of the lower order bits of the corrected Gray code into the partial track ID.

8. The method as recited in claim 7, further comprising combining the estimated track ID with the partial track ID to generate a detected track ID.

* * * * *